United States Patent [19]

Nakasuji et al.

[11] Patent Number: 5,659,338
[45] Date of Patent: Aug. 19, 1997

[54] ELECTRONIC APPARATUSES WHICH DISPLAYS VARIOUS GRAPHIC DATA AT THE TIME OF POWER-ON

[75] Inventors: Masataka Nakasuji, Nara; Shoichi Kawai, Osaka; Yoshiro Kihara, Nara; Junichi Saito, Osaka, all of Japan

[73] Assignee: Sharp Kabushiki Kaisha, Osaka, Japan

[21] Appl. No.: 341,208

[22] Filed: Dec. 5, 1994

[30] Foreign Application Priority Data

Dec. 7, 1993 [JP] Japan .................................. 5-305690

[51] Int. Cl.$^6$ ...................................................... G09G 5/00
[52] U.S. Cl. .......................... 345/201; 345/189; 345/211; 345/133; 364/700; 364/706; 364/707
[58] Field of Search ...................................... 345/189, 201, 345/211, 133; 364/700, 706, 707

[56] References Cited

U.S. PATENT DOCUMENTS

| | | | |
|---|---|---|---|
| 3,760,171 | 9/1973 | Wang et al. | 364/706 |
| 4,554,641 | 11/1985 | Haneda et al. | 364/706 |

FOREIGN PATENT DOCUMENTS

| | | |
|---|---|---|
| 2-114318 | 4/1990 | Japan . |
| 5-20016 | 1/1993 | Japan . |

Primary Examiner—Richard Hjerpe
Assistant Examiner—Vui T. Tran
Attorney, Agent, or Firm—Nixon & Vanderhye P.C.

[57] ABSTRACT

An electronic apparatus includes: a display screen; a power supply switch; a memory for storing a plurality patterns of graphic data, select information indicating which graphic data is selected, and the number of times by which the power supply switch is operated; a controller responsive to the power supply switch being operated for controlling the display screen to display graphic data of a pattern specified by the select information; and a device for updating in accordance with a predetermined scheme the select information and the number of times of operation of the power supply switch, if the power supply switch is operated and the number of times of operation of the power supply switch satisfies predetermined conditions. For example, when the power supply switch is operated a predetermined times, a dialog screen for selecting the next pattern is displayed. The patterns may be divided into groups so that upon operating the power supply switch predetermined times, the next pattern of the group is selected, and ultimately the dialog for selecting the next group is displayed.

8 Claims, 5 Drawing Sheets

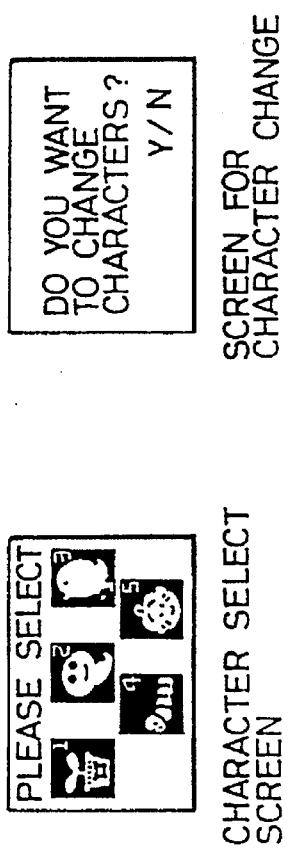
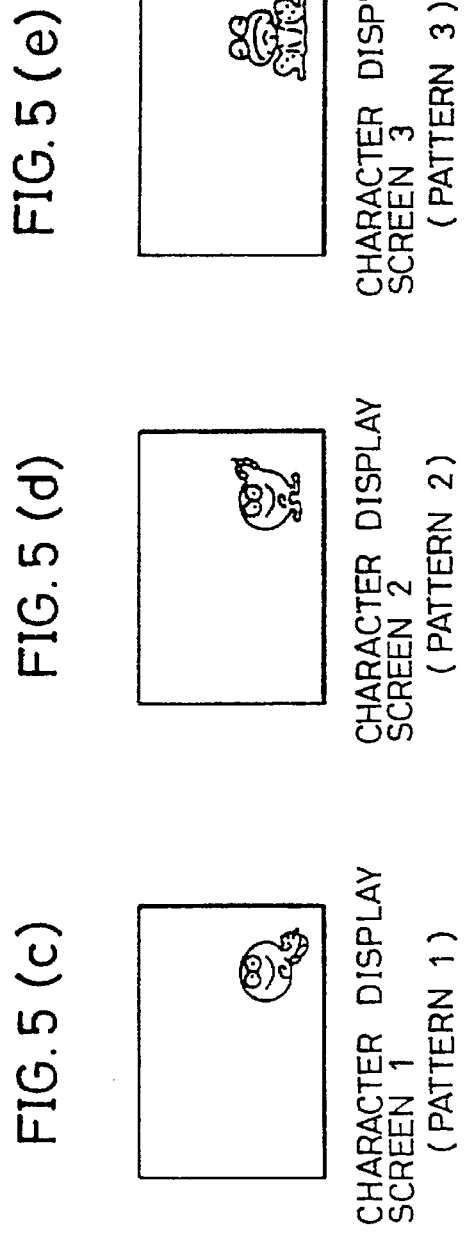

ELECTRONIC APPARATUSES WHICH DISPLAYS VARIOUS GRAPHIC DATA AT THE TIME OF POWER-ON

BACKGROUND OF THE INVENTION

1. Field of the Invention

The present invention relates to electronic apparatuses, and more particularly, to a small electronic apparatus such as an electronic organizer and a portable information terminal, and an electronic apparatus such as a personal computer.

2. Description of the Related Art

Most of conventional electronic apparatuses display a screen which clearly shows functions of the electronic apparatuses, such as a calendar, a menu screen, and a data input screen, at the time of power-up. Other apparatuses firstly display a message indicating that a power supply is switched on, or display graphics of a person, an animal, and a symbol mark instead of the message.

However, asides from apparatuses for business use, one of attracting points of electronic apparatuses for personal use is a fun element such as pleasure in using the apparatus. This is true especially in electronic organizers for children used by younger users. Conventional electronic apparatuses, however, do not include such an attractive aspect.

Improvements in display at the time of power-up have been proposed in Japanese Patent Laying-Open Nos. 2-114318 and 5-20016. An apparatus disclosed in these documents includes a plurality of icons in a menu screen, a corresponding function (such as a word processor program, a spread sheet program, and a drawing program) being assigned to each icon, whereby a user can activate a desired program by selecting an icon corresponding to a desired function.

Such a menu screen is displayed at the time of power-up in the apparatus disclosed in the above documents. For an easier use of the menu screen, the apparatus disclosed in the above documents is provided with a means for storing the frequency of selection of each icon so that each icon is displayed in the menu screen in a size reflecting the usage frequency thereof, thereby generating variety in the screen and facilitating usage of the menu.

Even in the apparatus disclosed in the above documents, however, only functions have been taken into account, and an aspect for providing an electronic apparatus which gives fun in using the apparatus has not been proposed. No matter how much ways of displaying of something like icons which have to represent plainly functions assigned thereto are improved, a matter of pleasure will not be improved proportionally.

SUMMARY OF THE INVENTION

Thus, an object of the present invention is to make electronic apparatuses more familiar to a user.

Another object of the present invention is to realize more attractive behavior of an electronic apparatus when the electronic apparatus is started.

Still another object of the present invention is to provide such an electronic apparatus whose graphics displayed on a display device at the time of start of the electronic apparatus are more attractive to a user.

According to the present invention, an electronic apparatus includes: a display device; a device for switching on a power supply; a first memory device for storing a plurality patterns of graphic data capable of being displayed on the display device; a second memory device for storing select information indicating which of the plurality of patterns is selected; a third memory device for updating its numerical value responsive to the power-on device being operated; a controller responsive to the power-on device being operated for controlling the display device to display graphic data of a pattern specified by the select information stored in the second memory device; and an updating device responsive to the power-on device being operated and the number stored in the third memory device satisfying a predetermined conditions for updating the contents of the second and third memory devices in accordance with a predetermined scheme.

The third memory device is updated in accordance with the operation of the power-on device. When the power-on device is operated, if the number stored in the third memory device satisfies the predetermined condition, the contents of the second memory device are updated in accordance with the predetermined scheme. At this time, graphic data to be displayed on the display device is different from that of the previous time. Thus, graphic data to be displayed varies every predetermined times the power-on device is operated, thereby providing a greater pleasure to a user when operating the electronic apparatus.

According to one aspect of the present invention, the third memory device is incremented by 1 in response to the power-on apparatus being operated. The updating device includes: a first constant memory device for storing a constant; a requesting device responsive to the power-on apparatus being operated, and the number stored in the third memory device having a predetermined relationship with the constant stored in the first constant memory device (e.g., the number and the constant being equal) for requesting an operator to select a new pattern; a device for writing the second memory device with a value corresponding to the pattern selected by the operator as select information; and a clearing device responsive to the power-on device being operated, and the number stored in the third memory device having a predetermined relationship with the constant stored in the first constant memory device (e.g., the number and the constant being equal) for clearing the third memory device.

Upon operating the power-on device by the number of times equal to the constant stored in the first constant memory device, selection of a new pattern is requested and the selected pattern is displayed at the time of power-on, thereby making an electronic apparatus more familiar to a user and giving a user a greater pleasure when operating the electronic apparatus.

According to another aspect of the present invention, the first memory device stores a plurality of pattern groups, each group including predetermined plurality of patterns with prefixed order. The updating device includes: a first constant memory device for storing a constant; a requesting device responsive to the power-on device being operated, and the number stored in the third memory device having a predetermined relationship with the constant stored in the first constant memory device (e.g., the number and the constant being equal) for requesting an operator to select a new pattern group; a device for writing the second memory device with a value designating the first pattern from the selected pattern group as select information; a clearing device responsive to the new pattern group being selected by the requesting device for clearing the third memory device; and a device responsive to the power-on device being operated, and the number stored in the third memory device satisfying predetermined conditions, for updating the select information within the second memory device so that each pattern of the selected pattern group is successively selected in accordance with the prefixed order.

As the power-on device is operated several times so as to update the third memory device, when the number stored in the third memory device is equal to the number stored in the first constant memory device, then the operator is requested to select a new pattern group. Upon selection of the new group, the first pattern of the group is displayed. As operations of the power-on device continue and when the number stored in the third memory device satisfies predetermined conditions, then the next pattern of the group is displayed at the time of power-on. Patterns of each group are thus varied successively to be displayed, and then selection of the next group is prompted when the contents of the third memory device are equal to the number stored in the first constant memory device, thereby providing more attractive behavior of the electronic apparatus when the apparatus is started.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5(a) through FIG. 5(e) illustrate screens displayed on the electronic apparatus.

DETAILED DESCRIPTION OF THE PREFERRED EMBODIMENTS

Figure 1:
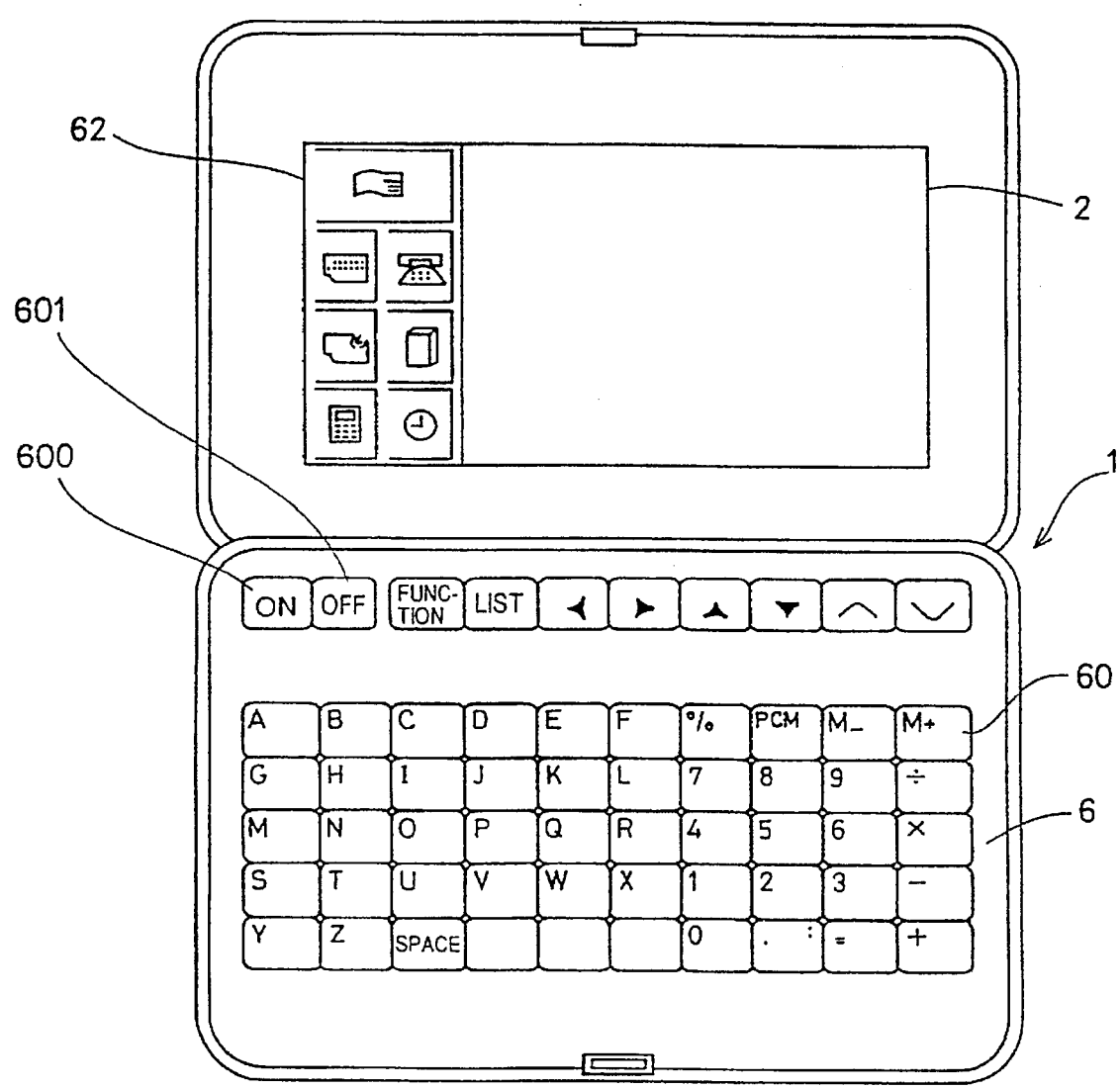
FIG. 1 is a plan view of an electronic apparatus according to one embodiment of the present invention.

Referring to FIG. 1, a main body 1 of an electronic apparatus according to one embodiment of the present invention includes an upper case and a lower case. Main body 1 of the electronic apparatus includes a display unit 2 provided on the upper side of the main body for displaying data, messages, operation results and the like, and an input unit 6 provided on the upper and lower sides of the main body and including a data inputting key group used for inputting various information.

Input unit 6 includes: a data inputting key group 60 for inputting character information and numerical information used in respective applications; a power-on key 600 for switching on a power supply of main body 1 of the electronic apparatus; a power-off key 601 for switching off the power supply; and a mode setting key group 62 for calling various functions (such as a calendar, a schedule, an address book, a memo, a calculator, and a clock) included in main body 1 of the electronic apparatus.

Figure 2:
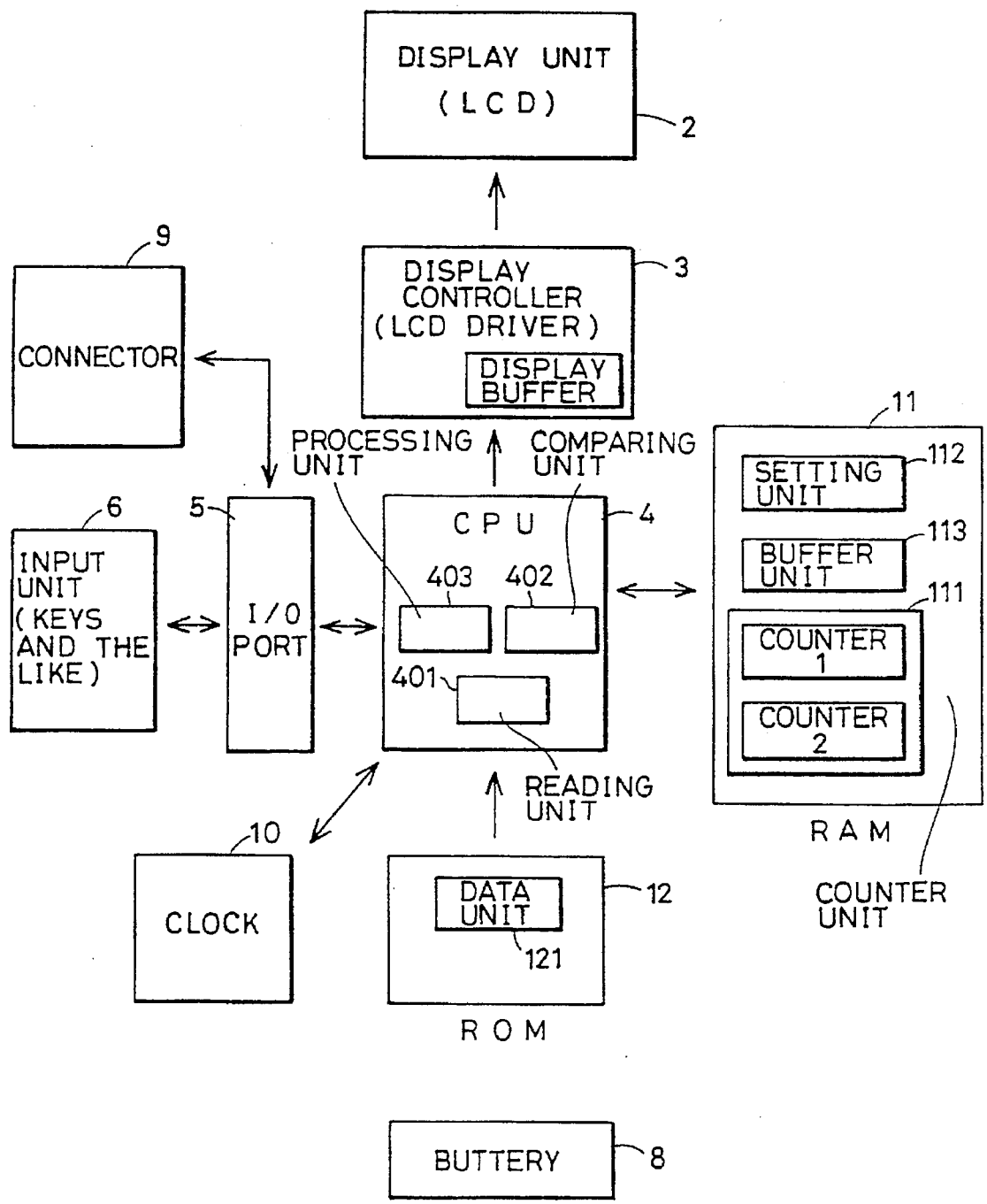
FIG. 2 is a system block diagram of the electronic apparatus shown in FIG. 1.

Referring to FIG. 2, the electronic apparatus includes a CPU 4, a display controller 3 for connecting display unit 2 to CPU 4 and for driving the display unit 2, a RAM (Random Access Memory) 11 and a ROM (Read Only Memory) 12 connected to CPU 4, an I/O port 5 provided for connecting input unit 6 to CPU 4, and a clock 10. A connector 9 is also connected to I/O port 5.

Referring to FIG. 2, CPU 4 performs operations such as overall inputs/outputs. Display unit 2 is implemented by, for example, a liquid crystal display (hereinafter referred to as LCD) of a dot matrix structure, and is driven through display controller (hereinafter referred to as LCD driver) in response to a control signal supplied from CPU 4 for displaying operation result, messages and the like. A key input from input unit 6 is processed by CPU 4 through I/O port 5. ROM 12 stores programs for implementing various functions of main body 1 of the electronic apparatus and the present invention, and graphic data of characters. RAM 11 includes a memory area for storing input data in main body 1 of the electronic apparatus, and a memory area for temporarily stores data as in operations. RAM 11 is backed up by a battery 8 so that the contents thereof will not be lost even at the time of power-off. LCD driven 3 has a display buffer 301 for temporarily storing display data applied from CPU 4.

Figure 3:
FIG. 3 illustrates character patterns.

ROM 12 and RAM 11 will be described further in detail. ROM 12 includes a data unit 121 which stores graphic data of characters. In this embodiment, there are five kinds of characters, each having three levels of growth patterns, so that data unit 121 stores a total of 15 graphic data of which specific examples are shown in FIG. 3. It is noted that in the following description, a term "character" is intended not only to refer to a character itself but also refer to graphic data patterns for displaying that character.

RAM 11 includes a counter unit 111, a setting unit 112, and a buffer unit 113. Counter unit 111 includes a counter 1 and a counter 2, in which the number of times of power-on is stored by counter 1 and growth levels of respective characters are stored by counter 2. The growth levels of characters assume numerical values of 1–3. Setting unit 112 stores numerical values 0–5 indicating which of five kinds of characters is selected. Note that "0" indicates that no character is selected. Buffer unit 113 is a memory area used for temporary storage when the graphic data within ROM 12 are loaded to a display buffer of LCD driver 3.

FIG. 5(a) shows a screen used for selecting a character out of five kinds of characters of the present embodiment, and FIGS. 5(c) shows display examples illustrating three levels of growth patterns of a tadpole which is a second character among those five characters. In this example, a pattern 1 shows a tadpole, a pattern 2 shows a tadpole with limbs, and a pattern 3 shows a frog. Transfer from pattern 1 to pattern 2 or from pattern 2 to pattern 3 is carried out automatically by 20 times of power-on. With another 20 times of power-on at pattern 3, a screen shown in FIG. 5(b) appears in which a different character can be selected. It is noted that although the number of times required to change patterns is set to 20 in this embodiment, any number can be set by the operator as desired.

Figure 4:
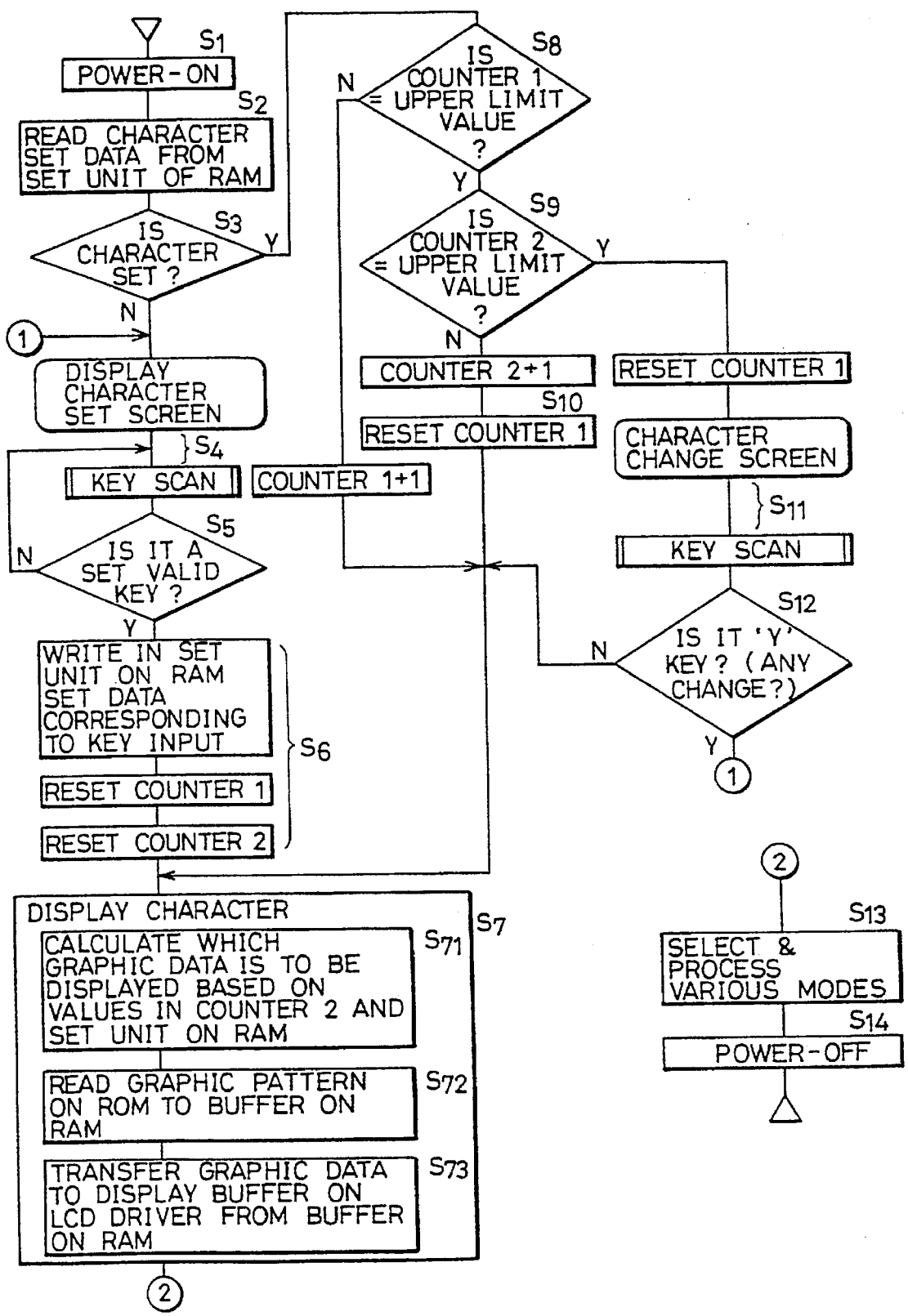
FIG. 4 shows a processing performed by the electronic apparatus shown in FIG. 2 in a flow chart.

One embodiment of a function for growing a character in use at the time of power-on according to the present invention will be described below in the context of a flow chart shown in FIG. 4. It is noted that in the following description, in CPU 4, a portion for reading data from the memory is referred to as a reading unit 401, a portion for comparing data is a comparing unit 402, a portion for carrying out other processings is a processing unit 403.

First, power-on key 600 of main body 1 of the electronic apparatus is operated to switch on a power supply (step S1). At this time, data for setting a character is read to reading unit 401 of CPU 4 from setting unit 112 provided on RAM 11. The data for setting a character assumes either one of values "0–5" in which "0" indicates a state with no character being set, and "1–5" indicate a state with any character out of five characters being selected (step S2). CPU 4 determines whether a character is already set by comparison in comparing unit 402 to determine if the data included in reading unit 401 is "0" (step S3).

If a character is not set (NO), the control proceeds to the character select screen illustrated in FIG. 5(a) to enter a key-input waiting state (step S4). At this time, if one of set valid keys (i.e., numerical numbers of 1, 2, 3, 4, 5) is pressed down, then it is determined that a character is selected and the control proceeds to the next step S6. Otherwise, it is determined that no character is selected and the control returns to step 4 (step S5). In step S5, the number (1–5) of the selected character is written in setting unit 112 provided on RAM 11. Further, counter 1 (the counter for power-on) and counter 2 (the counter for the character growth levels) included in counter unit 111 are respectively reset. More specifically, "0" is written in counter 1 and "1" (which is a value representing the first level of growth) is written in counter 2 (step S6).

The character is displayed in step S7, which will be described in detail below. First, a value (which indicates a type of the character) in setting unit 112 provided on RAM 11 is read to reading unit 401 of CPU 4, and then sent to processing unit 403. Similarly, a value (which represents the growth level) in counter 2 provided on RAM 11 is read to reading unit 401 of CPU 4 to be sent to processing unit 403. Processing unit 403 calculates from these two values in accordance with a predetermined function to determine which graphic data has been selected.

An example of the predetermined function is $$n=(a-1)*c+b$$

where n represents the order of graphic data to be selected in the whole data, a represents a value stored in setting unit 112, and b represents a value in counter 2, respectively. c represents the number of growth levels prepared in one character, which is 3 in this embodiment. Therefore, if a growth level 2 (i.e., the second pattern) of a character 1 is designated, then the second pattern is selected based on calculation of (1−1)*3+2=2. If a growth level 3 (i.e., the third pattern) of a character 4 is designated, then the 10th graphic data is selected based on calculation (4−1)*3+3=10 (step S71).

Accordingly, the corresponding graphic data is read from ROM 12 to buffer unit 113 provided on RAM 11 (step S72). That data is transferred to the display buffer 301 provided on LCD driver 3 for implementing graphic display shown in FIG. 5(c) (step S73).

In the meanwhile, if step S3 determines that the character is already set, then a value in counter 1 (which represents the number of times of power-on) included in RAM 11 is read to reading unit 401 of CPU 4, so that comparing unit 402 of CPU 4 determines whether the value is an upper limit value (which is 20 in this embodiment) of counter 1 (step S8). If the upper limit value is not reached, a data obtained by incrementing counter 1 by 1 is written in counter 1 to continue character display in step S7. In other words, if the number of times of power-on does not reach 20, then only counter 1 is counted up to display the character of the same growth level as in the previous time.

On the other hand, if the value in counter 1 is equal to its upper limit value, then it is determined whether a value in counter 2 reaches its upper limit value (which is 3 in this embodiment) (step S9). If the value in counter 2 is not equal to the upper limit value thereof, the value is read and incremented by 1 to be written in counter 2. Counter 1 is reset (step S10) for implementing character display in step S7. This processing corresponds to pattern 1 or pattern 2 in FIG. 5(c) thereby proceeding to the next upper growth level.

At this time, counter 1 is reset to attain "0" and starts counting another 20 times of power-on with a new growth level character.

If the value in counter 2 is equal to the upper limit value thereof, then counter 1 is reset. Accordingly, the screen for allowing character change shown in FIG. 5(b) is displayed to enter the key-input waiting state (step S11). This processing corresponds to pattern 3 in FIG. 5(c). Since there is no more growth pattern, there is displayed a screen for determining whether or not a character is to be changed to another character (FIG. 5(b)).

If other keys than "Y" key are pressed down in the screen shown in FIG. 5(b), then the character is not changed, and character display continues in step S7. In other words, the character of pattern 3 shown in FIG. 5(c) remains being displayed for the succeeding power-on. At this time, however, counter 1 is reset and returns to 0, the screen for character change shown in FIG. 5(b) will be redisplayed after another 20 times of power-ons are carried out.

On the other hand, if the "Y" key is selected in the screen shown in FIG. 5(b), then the screen for character selection shown in FIG. 5(a) is displayed. Accordingly, the control returns to the processing flow from step S4 for setting a character again (step S12).

After display of the character at the time of power-on, one of the functions such as the calendar, the schedule, the address book, the memo, the calculator, and the clock which are included in the electronic apparatus utilized in the present invention is selected by the user (step S13). Finally, power-off key 601 is operated to turn off the electronic apparatus (step S14).

It is noted that although in this embodiment, the types of characters are limited to 5, the growth levels are 3, and the number of times of power-on is 20, any value can be set depending on a size of the display of the apparatus and a memory capacity.

As described above, according to the present invention, a character to be displayed is varied depending on the frequency of use of the apparatus, thereby providing pleasure in using the apparatus to a user so that the electronic apparatus becomes more familiar to the user.

Also, by adding a function allowing an easy change of the types of characters to the electronic apparatus, the pleasure in using the apparatus is enhanced so that the user will not be tired of using the apparatus. Thus, the user can enjoy using the electronic apparatus by selecting any preferred character.

Although the present invention has been described and illustrated in detail, it is clearly understood that the same is by way of illustration and example only and is not to be taken byway of limitation, the spirit and scope of the present invention being limited only by the terms of the appended claims.

What is claimed is:

1. An electronic apparatus, comprising:
a display for displaying graphic data;
a power-on switch for switching on a power supply of said electronic apparatus;
a first memory for storing a plurality patterns of graphic data capable of being displayed on said display means;
a second memory for storing select information indicating which of said plurality of patterns is selected;
a third memory responsive to said power-on switch of the electronic apparatus being operated for updating a numerical value included in the third memory;
control circuitry responsive to said power-on switch being operated for controlling said display to display graphic data of a pattern specified by said select information; and update circuitry responsive to said power-on switch being operated, and the number stored in said third memory satisfying a predetermined condition for updating contents of said second memory and said third memory in accordance with a predetermined scheme.

2. The electronic apparatus according to claim 1, wherein said third memory is incremented by 1 in response to said power-on means being operated, and wherein said update circuitry includes a first constant memory for storing a constant, request means responsive to said power-on switch being operated, and the number stored in said third memory having a predetermined relationship with the constant stored in said first constant memory for requesting an operator to selected a new pattern, means for writing in said second memory as said select information a value corresponding to the pattern selected by the operator, and clear means responsive to said power-on switch being operated, and the number stored in said third memory means having a predetermined relationship with the constant stored in said first constant memory means for clearing said third memory means.

3. The electronic apparatus, according to claim 2, wherein said request means includes means for requesting the operator to select the new pattern in response to said power-on switch being operated, and the number stored in said third memory being equal to the constant stored in said first constant memory and wherein said clear means includes means for clearing said third memory in response to said power-on switch being operated, and the number stored in said third memory being equal to the constant stored in said first constant memory means.

4. The electronic apparatus according to claim 1, wherein said first memory stores a plurality of pattern groups, each group having a predetermined plurality of patterns with prefixed order, and wherein said update circuitry includes a first constant memory for storing a constant, request means for requesting an operator to select a new pattern group in response to said power-on switch being operated, and the number stored in said third memory having a predetermined relationship with the constant stored in said first constant memory, means for writing in said second memory as said select information a value designating a first pattern from the selected pattern group, clear means responsive to the new pattern group being selected by said request means for clearing said third memory, and update means responsive to said power-on switch being operated, and the number stored in said third memory satisfying a predetermined condition for updating said select information within said second memory so that respective patterns of said selected pattern group are successively selected with said order.

5. The electronic apparatus according to claim 4, wherein said request means includes means for requesting the operator to select the new pattern group in response to said power-on switch being operated, and the number stored in said third memory being equal to the constant stored in said first constant memory means.

6. The electronic apparatus according to claim 4, wherein said third memory includes a first counter and a second counter, said first constant memory stores a first upper limit value and a second upper limit value, said first counter is incremented in response to said power-on switch being operated, and is cleared if the value included in said first counter is equal to said first upper limit value, said second counter is incremented upon clearing of said first counter if the value included in said second counter is not equal to said second upper limit value, and is cleared in response to the different pattern group being selected by said request means, said request means includes means for requesting the operator to select the new pattern group in response to said power-on switch being operated, the value stored in said first counter being equal to said first upper limit value, and the number stored in said second counter being equal to said second upper limit value, and said means for updating said select information includes means responsive to said first counter being incremented for selecting a pattern specified by functions of said first and second counter values from said selected pattern group to write in said second memory as said select information a value for specifying the selected pattern.

7. The electronic apparatus according to claim 6, wherein said value for specifying said selected pattern is a prescribed function of said first and second counter values, and said first upper limit.

8. The electronic apparatus according to claim 7, wherein said predetermined function is a sum calculated by adding a product of said second counter value and said first upper limit value with said first counter value.

* * * * *